United States Patent [19]

Waechter et al.

[11] Patent Number: 4,596,933

[45] Date of Patent: Jun. 24, 1986

[54] BATTERYLESS MAGNETO-DRIVEN PORTABLE RADIAC

[75] Inventors: David A. Waechter; George O. Bjarke; Faustin Trujillo; Michael A. Wolf; C. John Umbarger, all of Los Alamos, N. Mex.

[73] Assignee: The United States of America as represented by the United States Department of Energy, Washington, D.C.

[21] Appl. No.: 662,656

[22] Filed: Oct. 19, 1984

[51] Int. Cl.$^4$ .................. G01T 1/175; G01T 1/15; G01T 1/142

[52] U.S. Cl. .................. 250/388; 250/374; 250/377

[58] Field of Search ............... 250/376, 377, 378, 374, 250/388

[56] References Cited

U.S. PATENT DOCUMENTS

| | | | |
|---|---|---|---|
| 2,871,365 | 1/1959 | Cahen et al. | 250/377 |
| 2,884,533 | 4/1959 | Richard-Foy | 250/377 |
| 3,405,274 | 10/1968 | Lakin | 250/388 |
| 3,878,496 | 4/1975 | Erickson | 250/336.1 |
| 4,419,579 | 12/1983 | East | 250/374 |

OTHER PUBLICATIONS

R. M. Longden-Thurgood and J. Pople, "A New Ratemeter Concept for Radiation Measuring Instruments", Nuclear Instruments and Methods, vol. 184, Nos. 2, 3, (Jun. 1981), pp. 533-536.

Primary Examiner—Alfred E. Smith
Assistant Examiner—Constantine Hannaher
Attorney, Agent, or Firm—Leonard C. Brenner; Paul D. Gaetjens; Judson R. Hightower

[57] ABSTRACT

A hand-powered alternator for generating an alternating voltage provides same through a rectifier to a high capacity capacitor which stores the resultant dc voltage and drives a voltage regulator to provide a constant low voltage output for a portable radiation detection instrument. The instrument includes a Geiger-Muller detector tube whose output is fed to a pulse detector and then through an event counter and LCD driver circuit to an LCD bar graph for visual display. An audio driver and an audio output is also provided. All circuitry used is low power so that the capacitor can be readily charged to a sufficient level to provide power for at least 30 minutes. A low voltage indicator is provided on the LCD display to indicate the need for manual recharging.

18 Claims, 12 Drawing Figures

BATTERYLESS MAGNETO-DRIVEN PORTABLE RADIAC

This invention is the result of a contract with the Department of Energy (Contract No. W-7405-ENG-36).

BACKGROUND OF THE INVENTION

The present invention relates generally to the field of portable radiation instruments and more particularly to a batteryless, hand-powered portable radiation detector.

In recent years a number of portable radiation instruments have been introduced. Such instrumentation permit field operations far away from power lines. Some instruments are hand held and thus permit an ease of use and extended utility. Nevertheless, all such instrumentation known to date rely on batteries for their operation. Batteries introduce weight to the instrument and add cost to it. Further, batteries require a source of electrical recharging and may discharge during instrument operation. During the recharge period the instrument is usually totally inoperable unless spare batteries are available.

It is therefore an object of the present invention to provide a batteryless portable radiation instrument.

It is another object of the present invention to provide a small, light-weight, hand-held, batteryless radiation detector.

It is yet another object of the present invention to provide a small hand-held, hand-powered, battery less radiation detector.

It is still another object of the present invention to provide a small hand-held, hand-powered radiation detector operable for periods of at least 30 minutes between hand-powering.

SUMMARY OF THE INVENTION

To achieve the foregoing and other objects, and in accordance with the purposes of the present invention, as embodied and broadly described herein, the apparatus of this invention may oomprise a hand-powered alternator for generating an alternating voltage, a rectifier for converting the alternating voltage to a dc voltage, a high capacity capacitor whic is charged by the dc voltage, a voltage regulator powered by the capacitor for providing a constant low voltage output a high voltage source powered by the low voltage output and a small Geiger-Muller detector tube powered by the high voltage source. The output of the Geiger-Muller tube is fed to a pulse detector and then through an event counter and LCD driver circuit to an LCD bar graph for visual display. The pulse detector also feeds an audio driver to provide an audio output. All circuitry used is low power so that the capacitor can be readily charged to a sufficient level to provide power for at least 30 minutes. A low voltage indicator is provided on the LCD display to indicate the need for manual recharging.

An advantage of the present invention is that the weight, cost and inconvenience of batteries are eliminated.

Another advantage of the present invention is that the portable detector can operate without manual recharging for relatively long periods of time.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF A PREFERRED EMBODIMENT OF THE INVENTION

Figure 1:
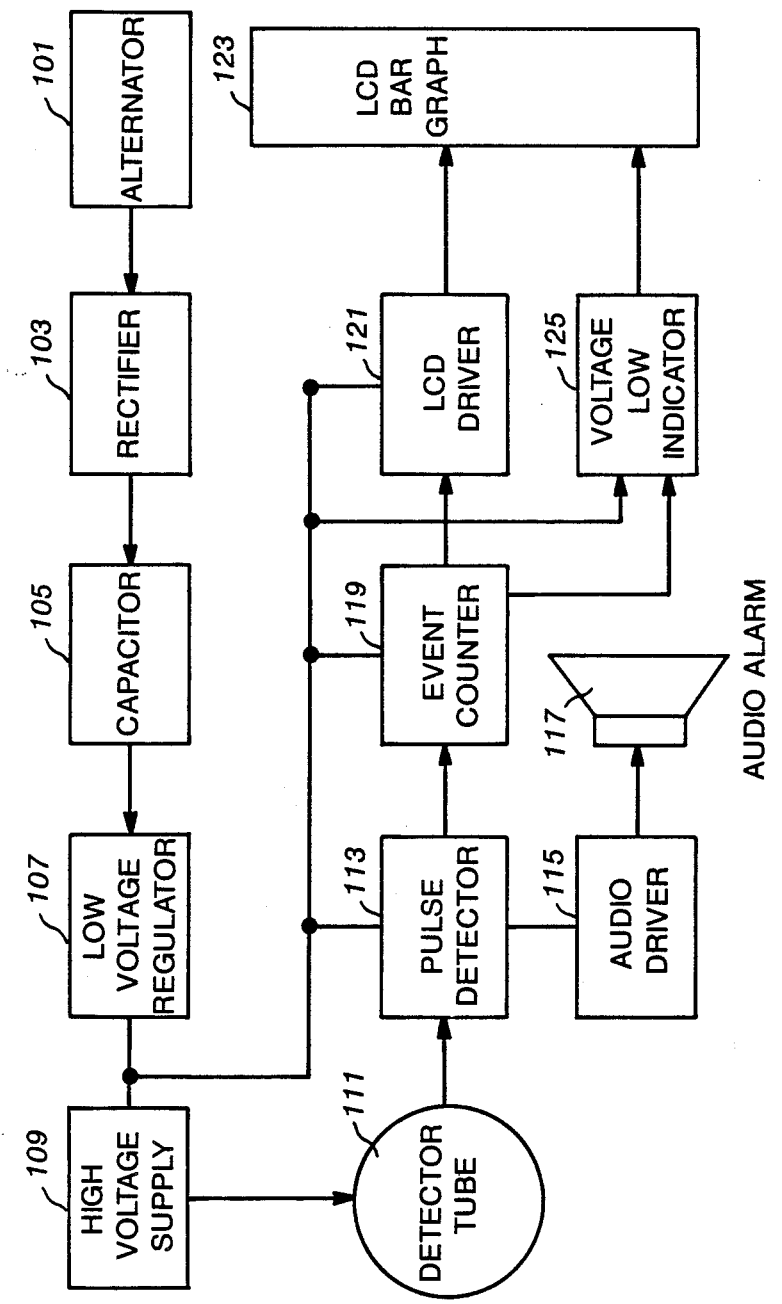
FIG. 1 is a block diagram of the hand-held, hand-powered portable radiation detector of the present vention.

With reference to FIG. 1 it can be seen that the initial power for the present invention is provided by an alternator 101. Alternator 101 is of the type commercially available for manually powered flashlights. A particularly suitable alternator is found in the Dynolight flashlight. Hand squeezing the alternator produces an output voltage in the order of 6 to 7 volts which is then sent to rectifier 103 and converted into a dc voltage which is stored on capacitor 105. The voltage on capacitor 105 is then regulated by a low voltage regulator 107 to produce an output voltage of 3.5 volts. The output of the low voltage regulator 107 is used to power a high voltage supply 109 to produce a high voltage output for the radiation detector tube 111. The output of the detector tube 111 feeds a pulse detector 113 which drives an audio driver 115 to sound an audio alarm 117 whenever radiation is detected. The pulse detector 113 also drives an event counter 119 which in turn drives an LCD driver 121 to drive a segmented LCD bar graph display 123. Thus the present invention operates without a battery to provide an audio alarm upon detection of radiation and a visible bar graph display indicating the amount of radiation detected over a period of time.

Figure 2:
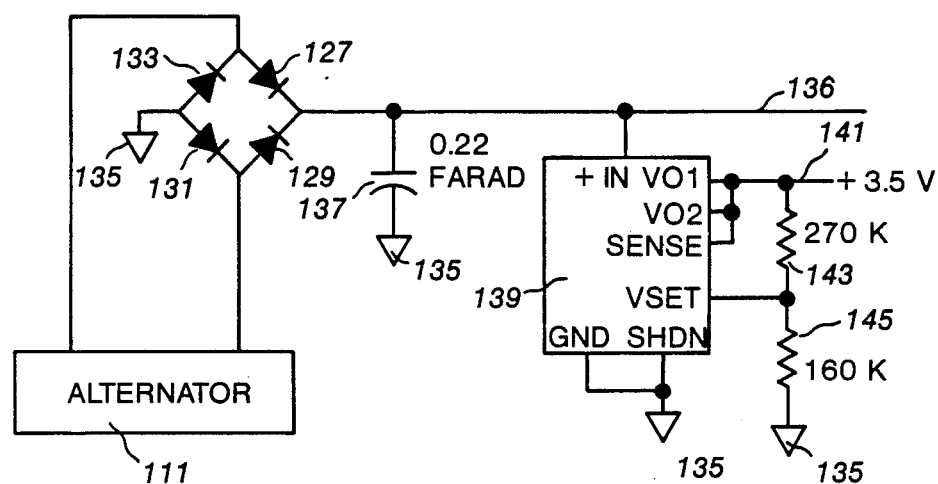
FIG. 2 is a schematic of the low voltage supply used in the present invention.

The present invention will be now described in more detail. FIG. 2 shows the alternator 111 driving a bridge rectifier comprised of diodes 127, 129, 131, and 133.

Since the voltage is relatively low at this stage it is advisable to use schottky type diodes because of their low voltage drop. Schottky diodes 11DQ030 are suitable for this application. The diodes 127, 129, 131, and 133 are connected between ground 135 and a large capacitor 137. The large capacitor 137 is preferably a 0.22 farad capacitor. Such capacitors are available from NEC Corporation in values up to at least 10 volts dc under model number M309. The voltage on capacitor 137 provides the input to a voltage regulator 139 to provide on the low voltage output line 141 a voltage of 3.5 volts. The voltage regulator 139 may be of any suitable type, preferably ICL7663. A voltage divider comprised of upper resistor 143 and lower resistor 145 provides the correct voltage setting level to secure the desired 3.5 volts output on low voltage output line 141.

Figure 3:
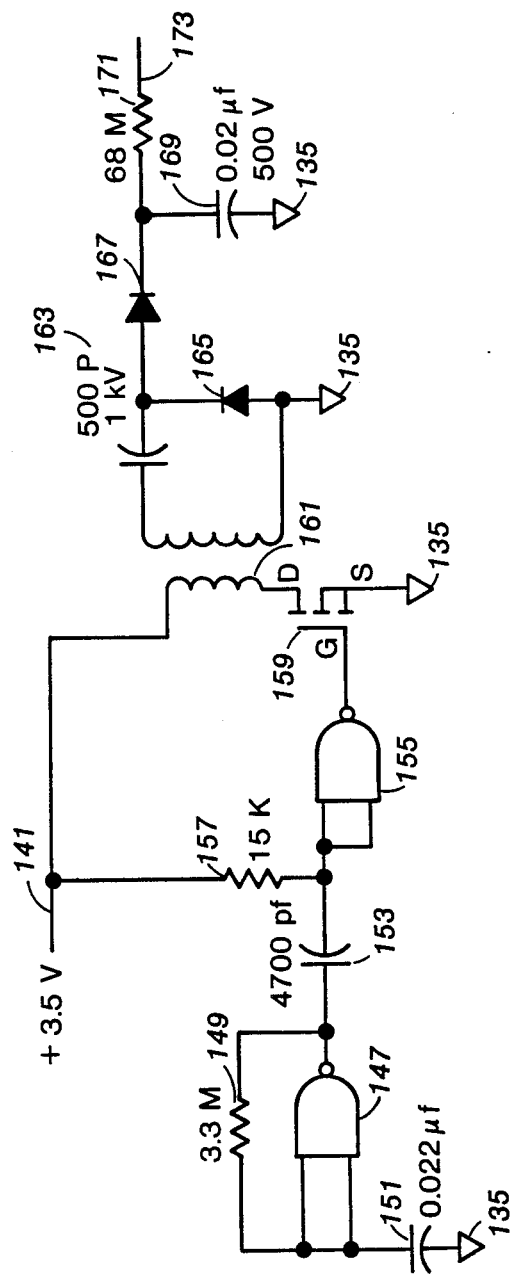
FIG. 3 is a schematic of the high voltage supply used in the present invention.

With reference to FIG. 3, the high voltage power generation is initiated by NAND gate 147. NAND gate 147 is connected as a free running oscillator by feedback resistor 149 and timing capacitor 151. The free running oscillator 147 is coupled through capacitor 153 to NAND gate 155 which is biased by resistor 157. NAND gates 147 and 155 are low powered type gates preferably CD4093. NAND gate 155 drives a field effect transistor 159 which is connected in series with a blocking oscillator type transformer 161 between ground 135 and the low voltage line 141. The field effect transistor 159 is preferably of type INV5000 and the transformer 161 may be of type Triad TY-201TZ. The output of the transformer 161 is coupled through capacitor 163 and rectified by diodes 165 and 167. These diodes may be of type 1N4007. The final high voltage output is filtered by capacitor 169 and current limited by resistor 171 to produce a high voltage output on high voltage output line 173. This voltage is selected to be appropriate for the detector tube 111. Nominally it may be in the order of 500 volts.

Figure 4:
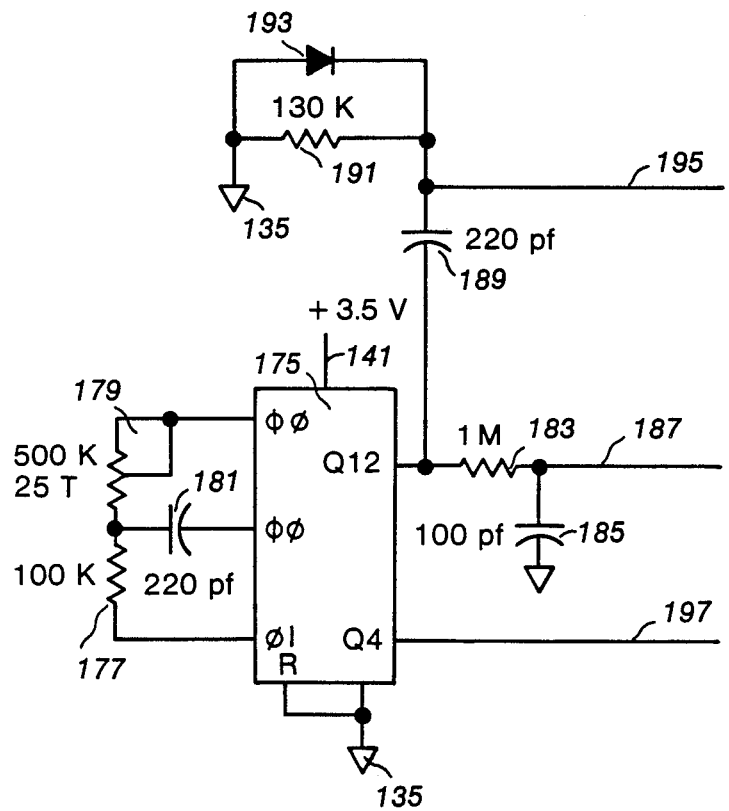
FIG. 4 is a schematic of a portion of the event counter used in the present invention.

With reference to FIG. 4, a portion of the event counter 119, shown in block form in FIG. 1, may be seen to comprise a clock 175, preferably of type CD4060. Resistor 177 and potentiometer 179 in cooperation with capacitor 181 adjusts the clock frequency to a fixed and desired rate. The Q4 output of clock 175 provides a LCD backplane signal on output line 197. The Q12 one second square wave output of clock 175 is slightly delayed by resistor 183 and capacitor 185 to provide a signal on output line 187. The Q12 output is also fed through cappacitor 189 to provide an output 195 which is connected to ground 135 through the parallel combination of resistor 191 and diode 193. The diode 193 may be of type 1N645.

Figure 5:
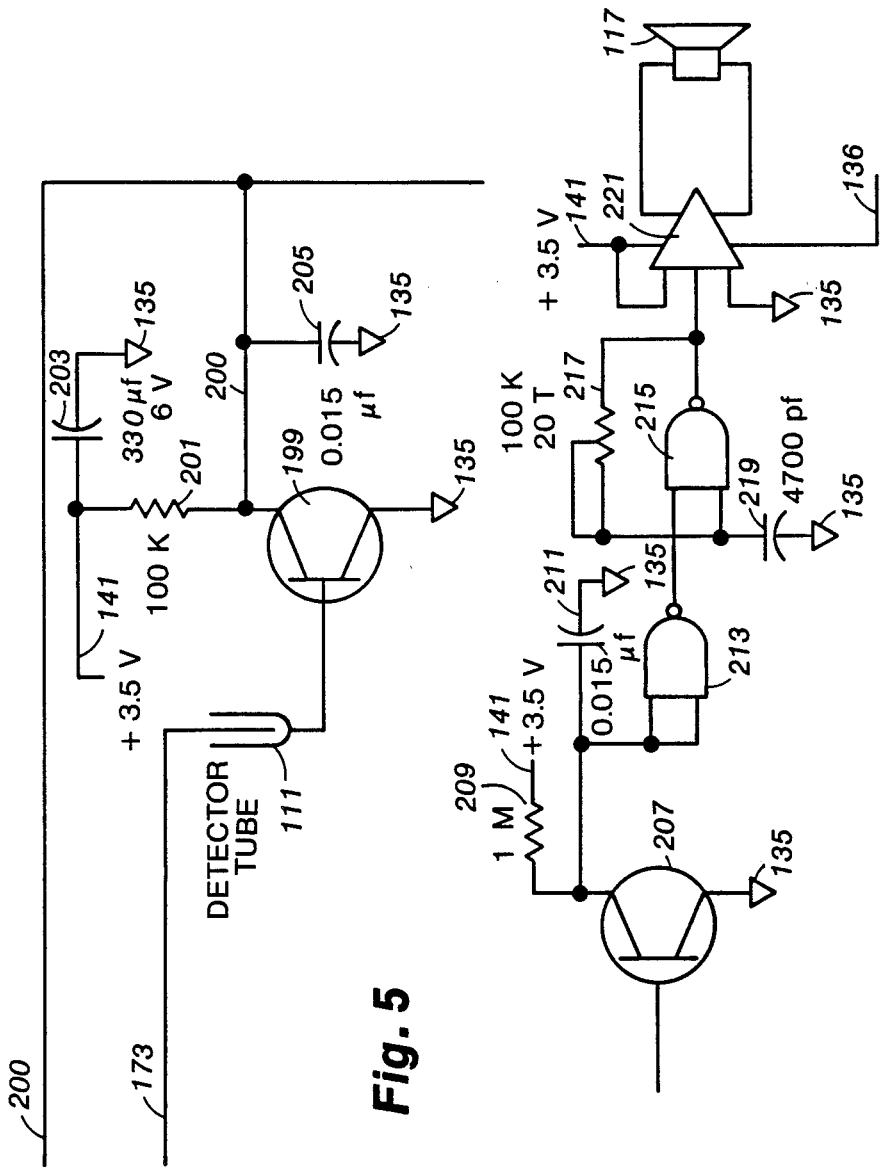
FIG. 5 is a schematic of the detector and audio alarm circuits used in the present invention.

FIG. 5 reveals the connection of the detector tube 111 and the circuitry required for an audio output by the audio alarm 117. The high voltage line 173 is connected to detector tube 111 which in turn feeds transistor 199. The transistor 199 may be of type 2N4401. The transistor 199 is connected in series with collector resistor 201 between ground 135 and the low voltage line 141. An additional filter capacitor 203 is also provided for the low voltage line 141. Pulse stretching is also provided on the transistor 199 output line 200 by capacitor 205. The output line 200 is further fed to transistor 207 for further amplification. Transistor 207 may also be of the type 2N4401. Collector resistor 209 and collector filter capacitor 211 are provided for transistor 207. The output of transistor 207 is fed through a NAND gate 213 operating solely as an inverter to feed NAND gate 215. Both of these NAND gates 213 and 215 may be of the type CD4093. The NAND gate 215 is connected as a gated oscillator having feedback potentiometer 217 and timing capacitor 219. NAND gate 215 feeds a complementary output buffer 221. The complementary output buffer 221 may be of type F4104. The complementary output buffer 221 drives the audio alarm 117 which preferably is a small piezoelectric buzzer.

Figure 6:
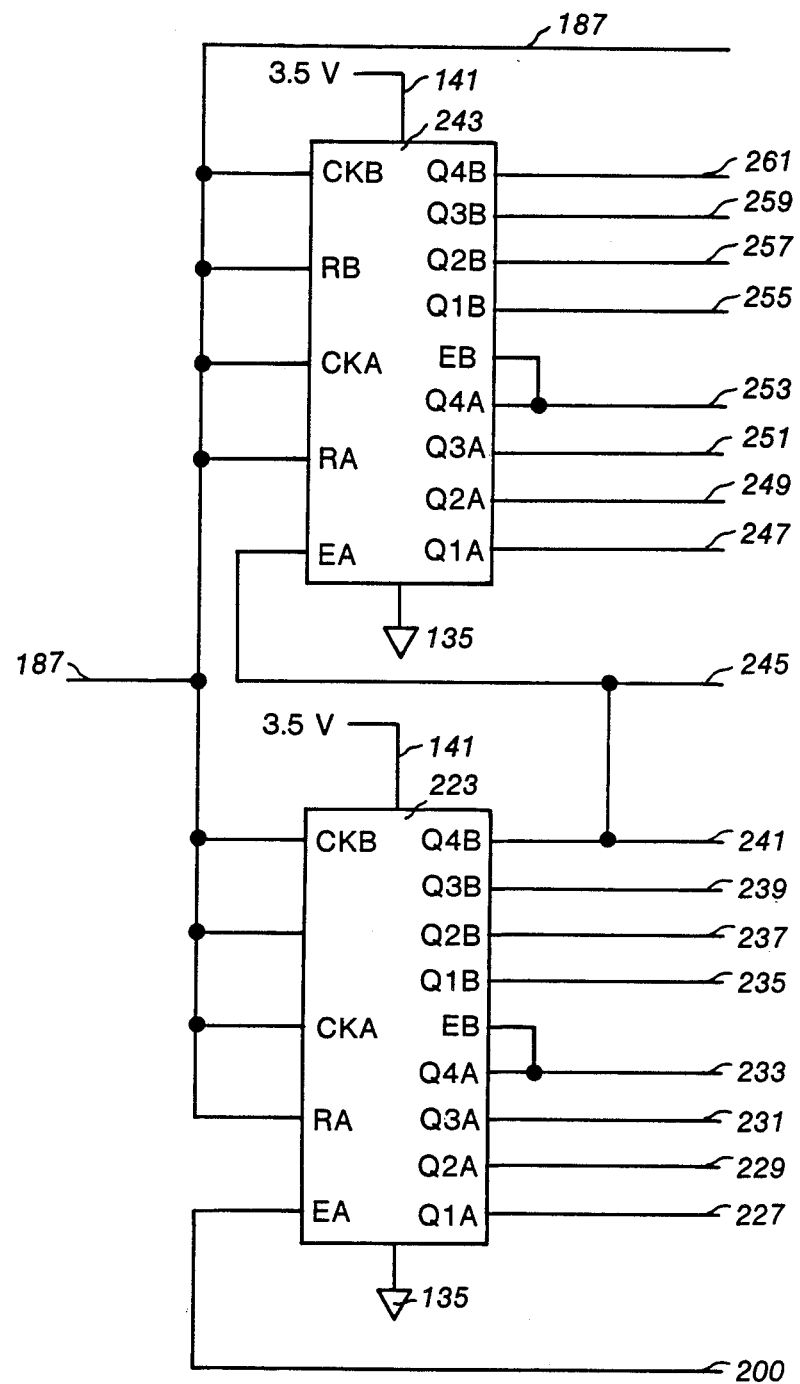
FIG. 6 is a logic diagram of another portion of the event counter not shown in FIG. 3.

FIG. 6 shows an additional portion of the event counter 119 shown in block form in FIG. 1 and having a portion thereof first described in FIG. 4. The output line 187 generated as shown in FIG. 4 feeds counters 223 and 243 on their CKB, RB, CKA, and RA inputs. The EA input of counter 223 is driven by line 200 which provides an output generated as shown in FIG. 5. The EA input for counter 243 is driven by an input line 245 which is provided by the Q4B output of counter 223 on line 241. The counters 223 and 243 may be of the type CD4518. For counter 223, Q1A provides an output on line 227, Q2A on line 229, Q3A on line 231, Q4A and EB on line 233, Q1B on line 235, Q2B on line 237, Q3B on line 239 and Q4B on line 241. Likewise counter 243 provides output Q1A on line 247, Q2A on line 249, Q3A on line 251, Q4A and EB on line 253, Q1B on line 255, Q2B on line 257, Q3B on line 259, and Q4B on line 261.

Figure 7:
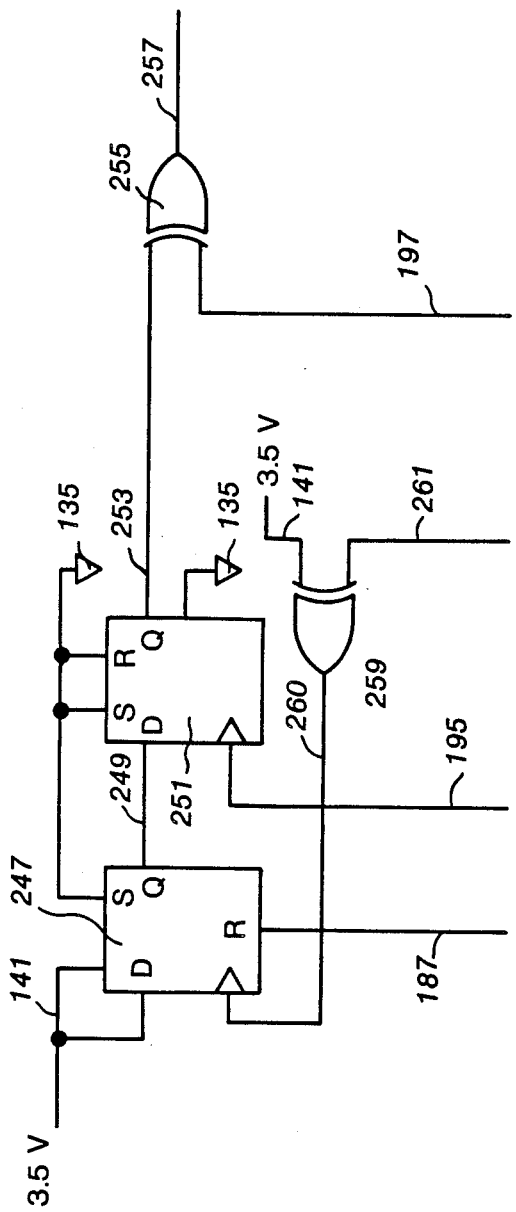
FIG. 7 is a logic diagram of a portion of the LCD driver circuit used in the present invention.

FIG. 7 shows a portion of the LCD driver 121 shown in block form in FIG. 1. D-Type flip-flops 247 and 251 are the primary logic elements of FIG. 7. The Q output of flip-flop 247 on line 249 drives the D input of flip-flop 251. The Q output on line 253 feeds an exclusive OR gate 255 to provide an output on line 257. Input line 197 generated and shown in FIG. 4 provides another input to the exclusive OR gate 255. Exclusive OR gate 259 is fed by an input line 261 generated as shown in FIG. 6 to produce an output on line 260 to toggle the flip-flop 247. Flip-flop 247 is reset by the signal on line 187 generated as shown in FIG. 4. Flip-flop 251 is toggled by the signal on line 195 generated as shown in FIG. 4. Flip-flops 247 and 251 may be of the type CD4013, and the exclusive OR gates 255 and 259 likewise are preferably formed of CMOS logic components.

Figure 8:
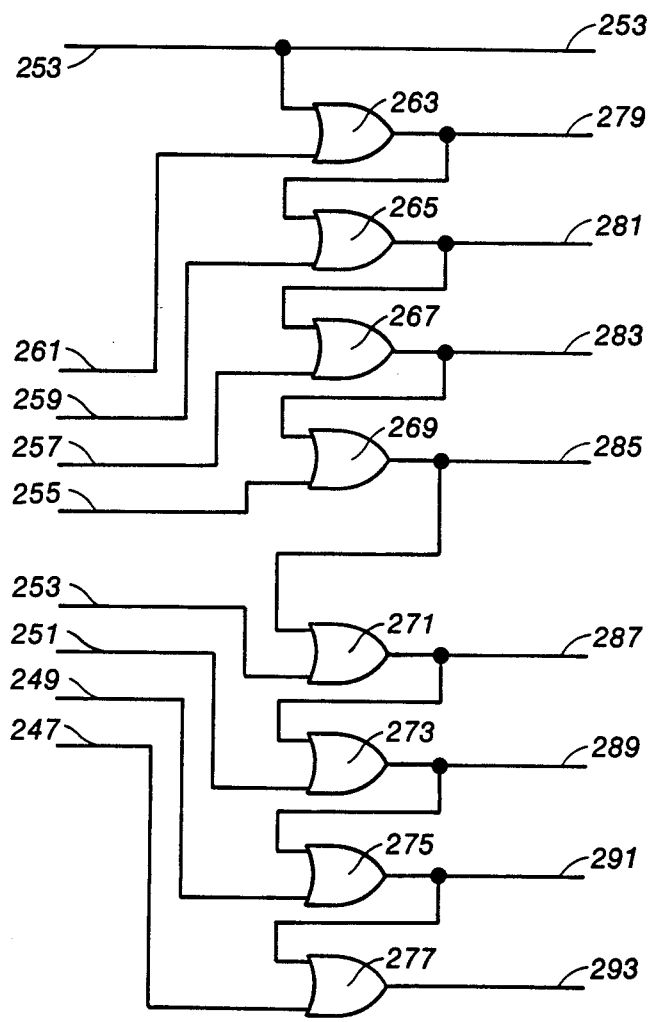
FIG. 8 is a logic diagram of a portion of the LCD driver circuit not shown in FIG. 7.

FIG. 8 shows another portion of the LCD driver 121 shown in block form in FIG. 1. OR gate 263 is fed by lines 253 and 261 to provide an output 279. The signal on line 253 is generated as shown in FIG. 7 as the Q output of flip-flop 251. The signal on line 261 is generated as shown in FIG. 6 as the Q4B output of counter 243. OR gate 265 is fed by line 279 and line 259 to provide an output on line 281. OR gate 267 is fed by lines 281 and 257 to provide an output on line 283. OR gate 269 is fed by lines 283 and 255 to provide an output on line 285. OR gate 271 is fed by lines 285 and 253 to provide an output on line 287. OR gate 273 is fed by lines 287 and 251 to provide an output on line 289. OR gate 275 is fed by lines 289 and 249 to provide an output on line 291. OR gate 277 is fed by lines 291 and 247 to provide an output on line 293. The signals generated on lines 247, 249, 251, 253, 255, 257, 259, and 261 are generated as shown in FIG. 6. All of the OR gates shown in FIG. 8 are preferably of the low power CMOS logic type.

Figure 9:
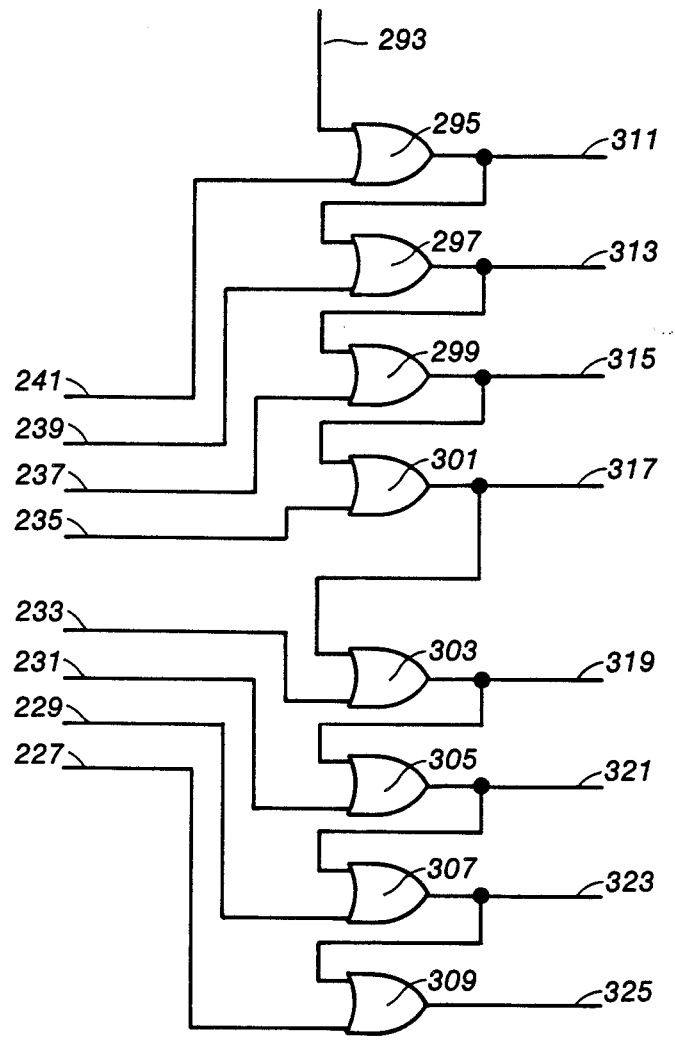
FIG. 9 is a logic diagram of a portion of the LCD driver circuit not shown in FIGS. 7 or 8.

FIG. 9 shows a further portion of the LCD driver 121 shown in block form in FIG. 1. OR gate 295 is inputted by line 293 as generated in FIG. 8 and by line 241 as generated in FIG. 6 to produce an output on line 311. OR gate 297 is inputted by lines 311 and 239 to produce an output on line 313. OR gate 299 is inputted by lines 313 and 237 to produce an output on line 315. OR gate 301 is inputted by lines 315 and 235 to produce on output on line 317. OR gate 303 is inputted by lines 317 and 233 to produce an output on line 319. OR gate 305 is inputted by lines 319 and 231 to produce an output on line 321. OR gate 307 is inputted by lines 321 and 229 to produce an output on line 323. OR gate 309 is inputted by lines 323 and 227 to produce an output on line 325. The signals on lines 227, 229, 231, 233, 235, 237, 239, and 241 are generated as shown in FIG. 6. All of the OR gates shown in FIG. 9 are preferably of the low power CMOS type.

Figure 10:
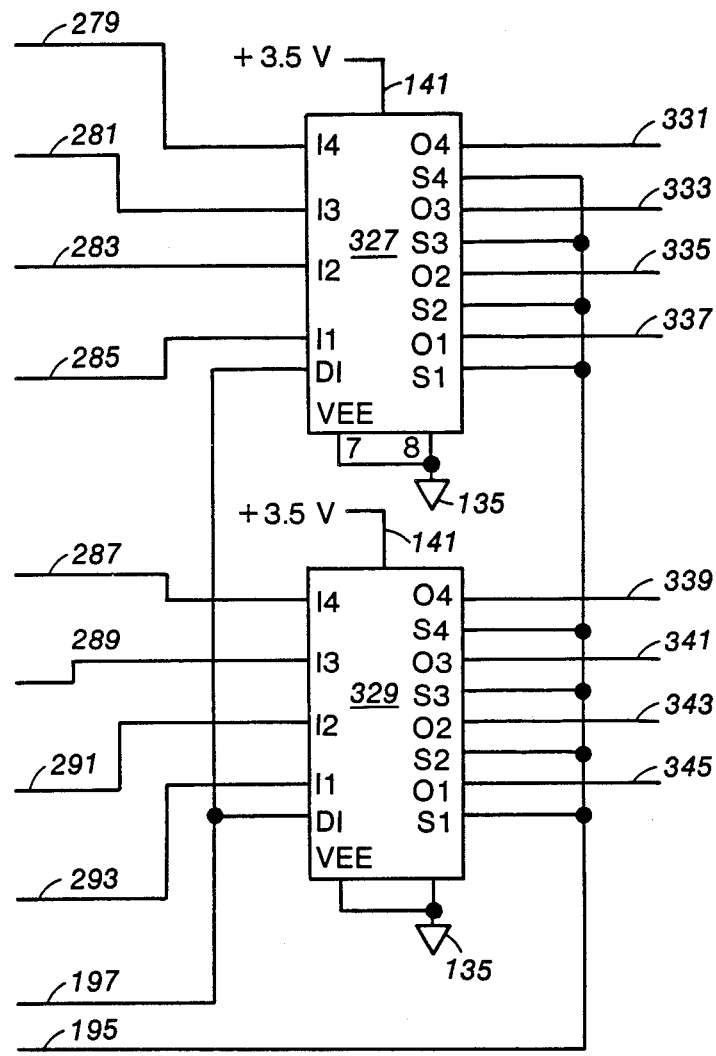
FIG. 10 is a logic diagram of a portion of the LCD driver circuit not shown in FIGS. 7, 8 or 9.

FIG. 10 shows a portion of the LCD driver 121 first shown in block form in FIG. 1. Voltage translator 327 is fed on its D1 input by line 197, on input I1 by line 285, on input I2 by line 283, on input I1 by line 281, and on input I4 by line 279. Voltage translator 327 is further provided on inputs S1, S2, S3, and S4 by line 195. Voltage translator 327 provides outputs O1 on line 337, O2 on line 335, O3 on line 333, and O4 on line 331. The purpose of the voltage translator 327 is to translate the incoming logic voltages to levels acceptable for the LCD bar graph generator 123 shown in FIG. 1 and as will be described hereinafter. Voltage translator 329 receives on input D1 signals on line 197, on input I1 signals from line 293, on I2 signals from line 291, on I3 signals from line 289, and on I4 signals from line 287. Also line 195 inputs the voltage translator 329 on inputs S1, S2, S3, and S4. Voltage translator 329 provides an output O1 on line 345, O2 on line 343, O3 on line 341, and O4 on 339. Preferably voltage translators 327 and 329 are of the type CD4054.

Figure 11:
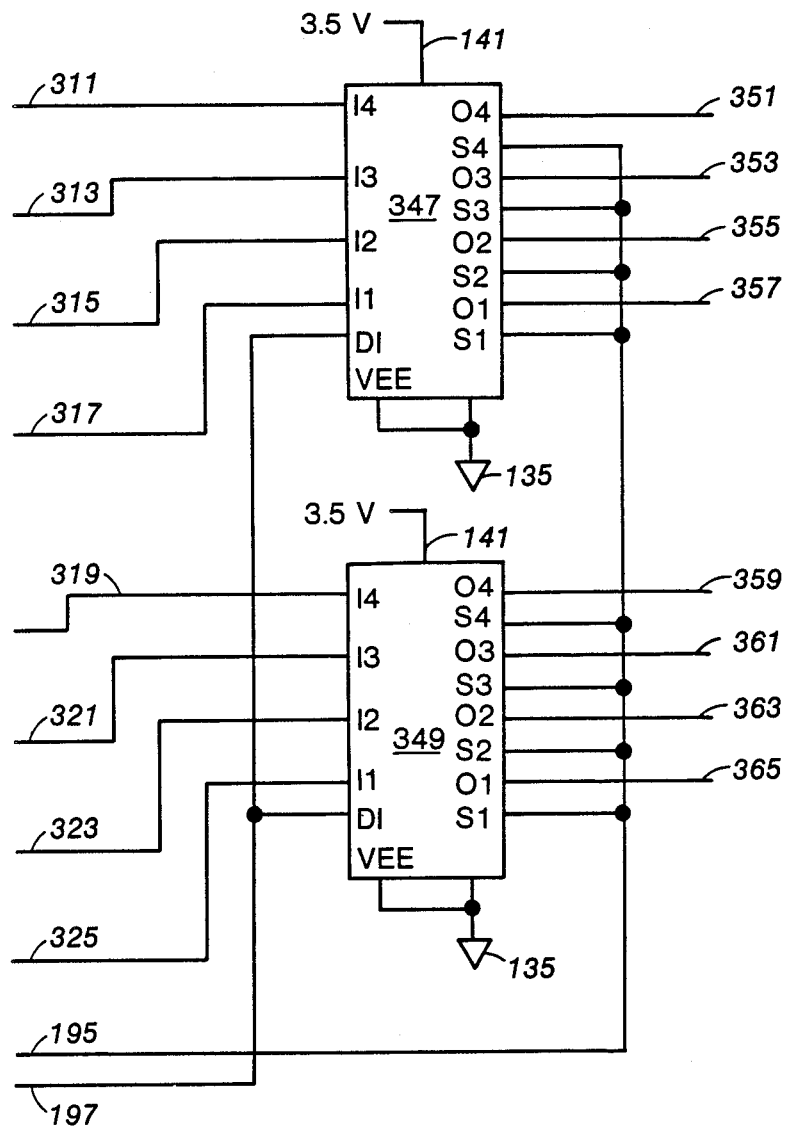
FIG. 11 is a logic diagram of a portion of the LCD driver circuit not shown in FIGS. 7, 8, 9, or 10.

FIG. 11 shows a further portion of the LCD driver 121 first shown in block form in FIG. 1. Voltage translator 347 receives its D1 input from line 197, I1 input from line 317. I2 input from line 315, I3 input from line 313. and I4 input from line 313. Also line 195 drives voltage translator 347 inputs S1, S2, S3, and S4. Voltage translator 347 provides output O1 on line 357, O2 on line 355, O3 on line 353, and O4 on line 351. Voltage translator 349 receives its D1 input from line 197, its I1 input from line 325, its I2 input from line 323, I3 input from line 321. and I4 input from line 319. Also line 195 provides voltage translator 349 with an input to its S1, S2, S3, and S4 inputs. Voltage translator 349 provides its output O1 on line 365, O2 on line 363, O3 on line 361, and O4 on line 359. Preferably voltage translators 347 and 349 are of type CD4054.

Figure 12:
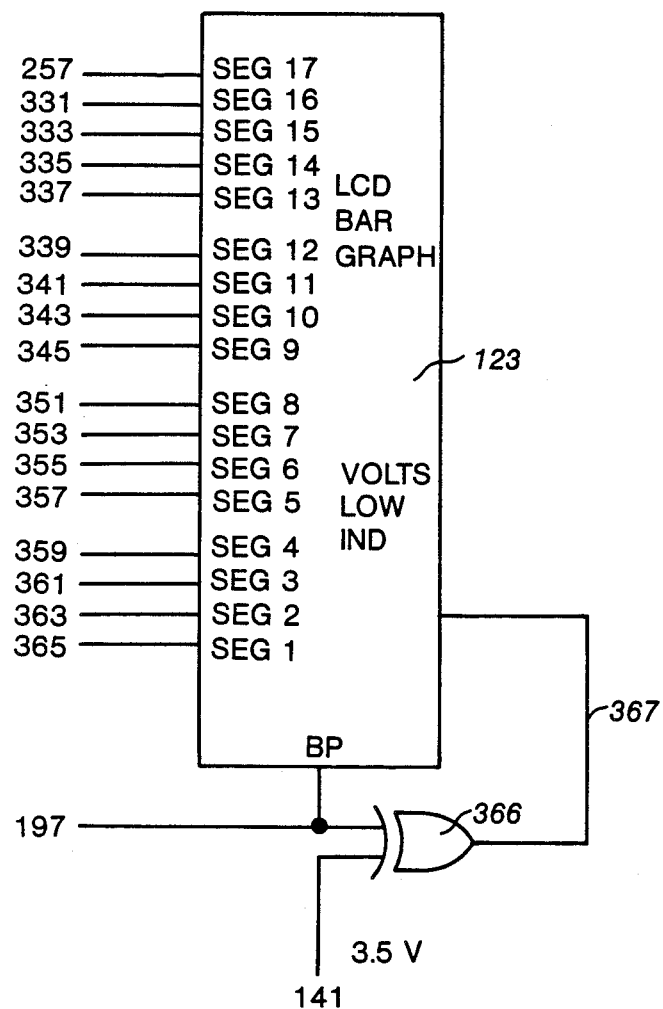
FIG. 12 is a block and logic diagram of the LCD bar graph display used in the present invention.

FIG. 12 is a more detailed illustration of the LCD bar graph generator 123. Suitable devices for generator 123 are available from UCE, Inc. In the preferred embodiment seventeen segments of the LCD bar graph generator 123 are used to give a bar graph indication of the number of events occurring during a period of time. Segment 1 is fed by line 365, Segment 2 by 363, Segment 3 by 361, Segment 4 by 359, Segment 5 by 357, Segment 6 by 355, Segment 7 by 353, Segment 8 by 351. Segment 9 by 345, Segment 10 by 343, Segment 11 by 341, Segment 12 by 339, Segment 13 by 337, Segment 14 by 335, Segment 15 by 333, Segment 16 by 331 and Segment 17 by 257. The segments preferably display in logarithmically form exposure rates over four decades from 1 millirad/hr to 10 millirad/hr. Further, line 197 provides an input to exclusive OR gate 366 and BP input of LCD bar graph display 123. The exclusive OR gate 366 is also provided with an input of nominally 3.5 volts on the low voltage line 141 to provide an output 367 to give an indication on the LCD bar graph generator of a voltage low indication. The voltage low indication informs the user that the voltage on capacitor 105 has been reduced to such a level as to no longer provide a stable regulated output of low voltage regulator 107 and that the alternator 101 must therefore be squeezed or manually manipulated to generate an additional voltage through rectifier 103 for capacitor 105 to drive again regulator 107, see again FIG. 1.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A portable radiation detector comprising:
    a. hand powered alternator means for producing an alternating voltage by hand manipulation;
    b. rectifier means connected to said hand powered alternator means for producing an unregulated dc voltage from said alternating voltage;
    c. a capacitor connected to said rectifier means for storing said unregulated dc voltage;
    d. regulator means connected to said capacitor for producing a regulated low voltage from said stored unregulated dc voltage;
    e. high voltage means fed by said low voltage means for producing a high voltage output;
    f. radiation detecting means powered by said high voltage output for detecting radiation pulses;
    g. pulse detector means fed by said radiation detecting means for producing an electrical pulse for each radiation pulse detected by said radiation detecting means;
    h. event counting means fed by said pulse detector means for integrating said electrical pulses produced by said pulse detector means over a period of time and for producing an output signal representative thereof;
    i. LCD driving means coupled to said event counting means for translating said output signal thereof into a signal of suitable LCD display driving levels; and
    j. LCD display means coupled to said LCD driving means for visually displaying said signal of suitable LCD display driving levels.

2. The invention according to claim 1 further including audio means connected to said pulse detecting means for producing an audio signal for each said electrical signal produced by said pulse detecting means.

3. The invention according to claim 2 wherein said audio means includes an audio driver to amplify and shape said electrical signal produced by said pulse detecting means; and an audio alarm driven by said audio driver to generate said audio signal.

4. The invention according to claim 3 where said audio alarm is a piezoelectric chirper.

5. The invention according to claim 1 wherein said capacitor is of sufficient capacity to store a usable level of said unregulated dc voltage for a period of at least 30 minutes.

6. The invention according to claim 1 wherein said capacitor is on the order of 0.2 farad.

7. The invention according to claim 1 wherein said rectifier means includes a diode bridge rectifier.

8. The invention according to claim 7 wherein each diode in said diode bridge rectifier is a Schottky diode.

9. The invention according to claim 1 further including low voltage detecting means for detecting when said regulated low voltage has fallen below its regulated level and for producing a signal representative thereof.

10. The invention according to claim 9 wherein said LCD display means is further connected to said low voltage detecting means for visually displaying a low voltage indication upon production of said signal representative thereof.

11. The invention according to claim 1 wherein said LCD display means includes a LCD bar graph display.

12. The invention according to claim 11 wherein said LCD bar graph display is capable of displaying at least a seventeen segment bar display.

13. The invention according to claim 12 further including low voltage detecting means for detecting when said regulated low voltage has fallen below its regulated level and for producing a signal representative thereof.

14. The invention according to claim 13 wherein said LCD display means is further connected to said low voltage detecting means for visually displaying a low voltage indication upon production of said signal representative thereof.

15. The invention according to claim 1 wherein said radiation detection means includes a gamma detecting tube.

16. The invention according to claim 15 wherein said gamma detecting tube is a Geiger-Muller tube.

17. The invention according to claim 1 wherein said high voltage output of said high voltage means is approximately a 500 volt output.

18. A low-power, hand-holdable radiation detector comprising;
   a. hand powered alternator means for producing an alternating voltage by hand manipulation;
   b. a Schottky diode bridge rectifier connected to said hand powered alternator means for producing an unregulated dc voltage from said alternating voltage;
   c. a capacitor connected to said rectifier means for storing said unregulated dc voltage, said capacitor being in range of 0.2 farads;
   d. regulator means connected to said capacitor for producing a regulated low voltage from said stored unregulated dc voltage;
   e. high voltage means fed by said low voltage means for producing a high voltage output of approximately 500 volts;
   f. a gamma radiation detecting Geiger-Muller tube powered by said high voltage output for detecting gamma radiation pulses;
   g. pulse detector means fed by said gamma radiation detecting Geiger-Muller tube for producing an electrical pulse for each radiation pulse detected by said radiation detecting means;
   h. audio means connected to said pulse detecting means for producing an audio signal for each said electrical signal produced by said pulse detecting means, said audio means comprising an audio driver to amplify and shape said electrical signal produced by said pulse detecting means, and an audio alarm driven by said audio driver to generate said audio signal;
   i. event counting means fed by said pulse detector means for integrating said electrical pulses produced by said pulse detector means over a period of time and for producing an output signal representative thereof;
   j. LCD driving means coupled to said event counting means for translating said output signal thereof into a signal of suitable LCD display driving levels;
   k. low voltage detecting means for detecting when said regulated low voltage has fallen below its regulated level and for producing a signal representative thereof; and
   l. LCD bar graph display means coupled to said LCD driving means for visually displaying a bar graph representation of said signal of suitable LCD display driving levels and coupled to said low voltage detecting means for visually displaying a low voltage indication upon production of said signal representative thereof.

* * * * *